June 18, 1940.  J. W. SCHLEGEL ET AL  2,205,177
SUGAR GRANULE MANUFACTURE
Filed Nov. 8, 1937   3 Sheets-Sheet 3

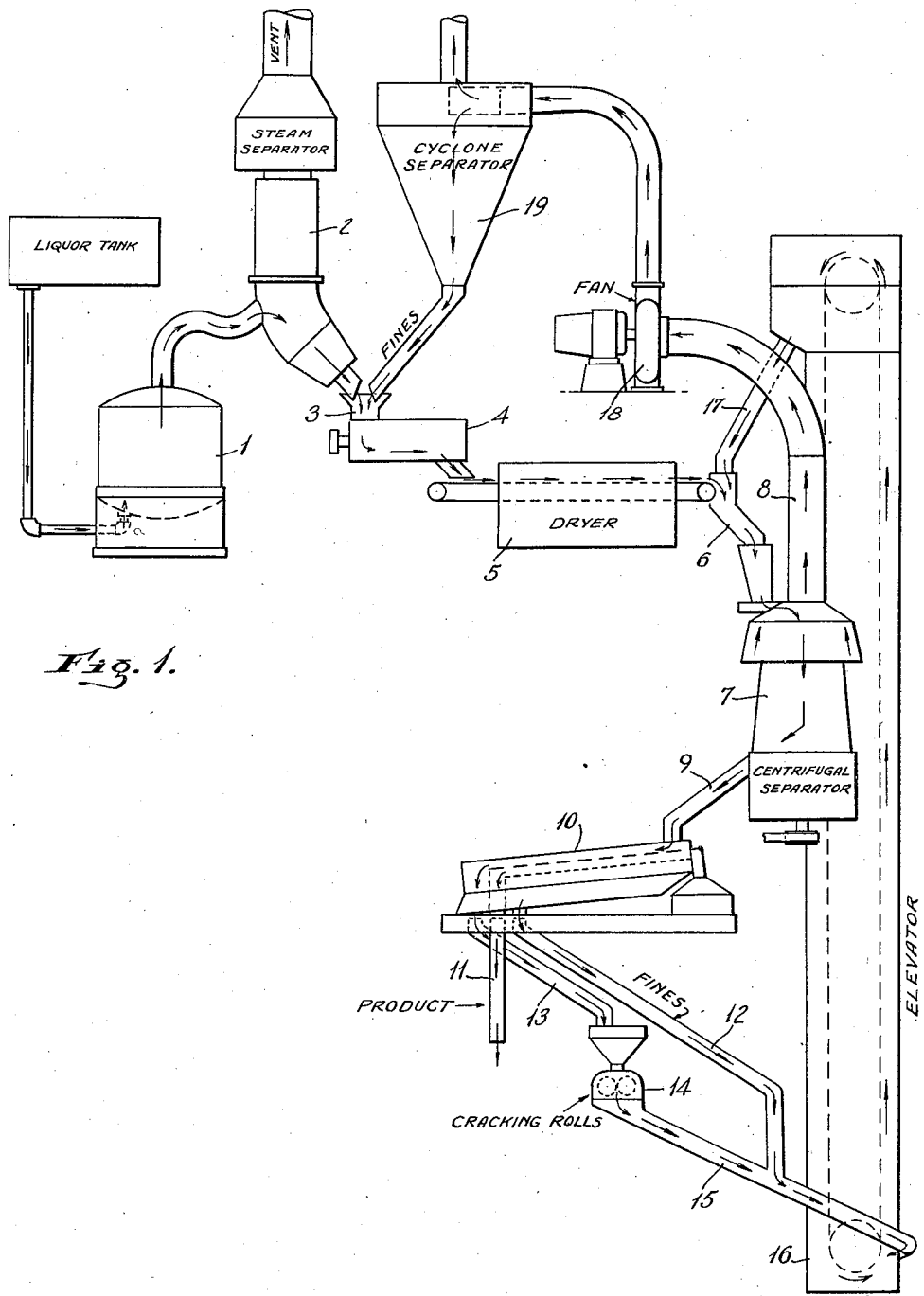

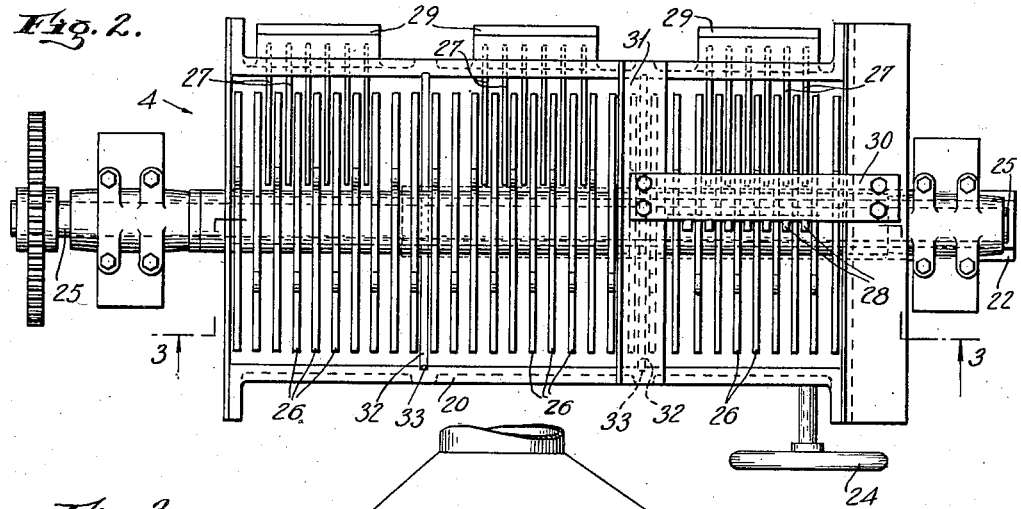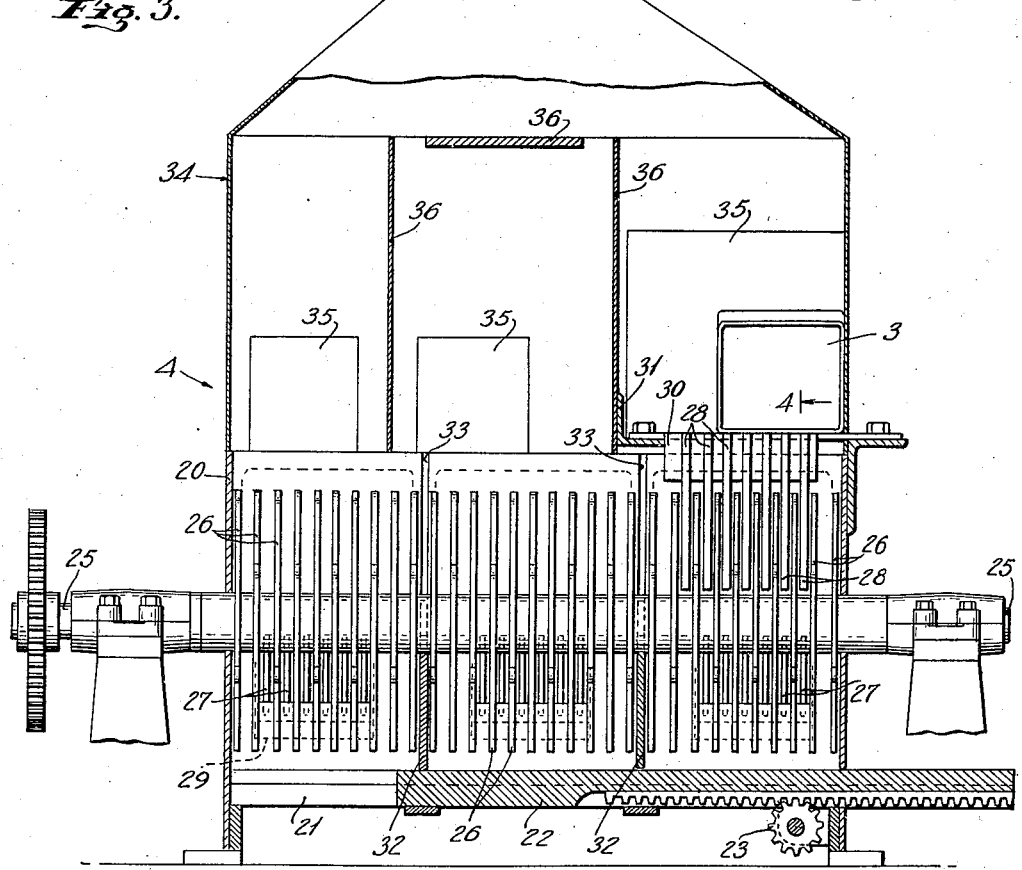

INVENTORS
John W. Schlegel
and Louis Lang
BY
Jeffery, Kimball & Eggleston
ATTORNEYS Patented June 18, 1940

2,205,177

UNITED STATES PATENT OFFICE 2,205,177

SUGAR GRANULE MANUFACTURE

John W. Schlegel, East Orange, N. J., and Louis Lang, New York, N. Y., assignors to The National Sugar Refining Company, a corporation of New Jersey Application November 8, 1937, Serial No. 173,330

12 Claims. (Cl. 127—58)

The invention relates particularly to the manufacture of a granular sugar product of the kind in which each granule is composed of compacted sugar crystals and non-crystallizable materials retained from the original raw syrup or purposely introduced therein, but so incorporated in the mass of each granule as to produce a non-sticky free-flowing product suitable for sprinkling on food if desired and capable of storage for long periods without objectionable caking or solidifying.

Certain features of the invention, as will presently appear, may be used also in other relations than the manufacture of the particular kind of sugar referred to and to the extent the invention is applicable thereto, such related or cognate uses are not disclaimed.

The general process is illustrated by a flow-sheet diagram, constituting Fig. 1. The parts shown in this figure are not to scale.

Fig. 2 is a top plan of the granule-former, representing one of the steps of the process.

Fig. 3 is a longitudinal vertical section of Fig. 2.

Figure 4:
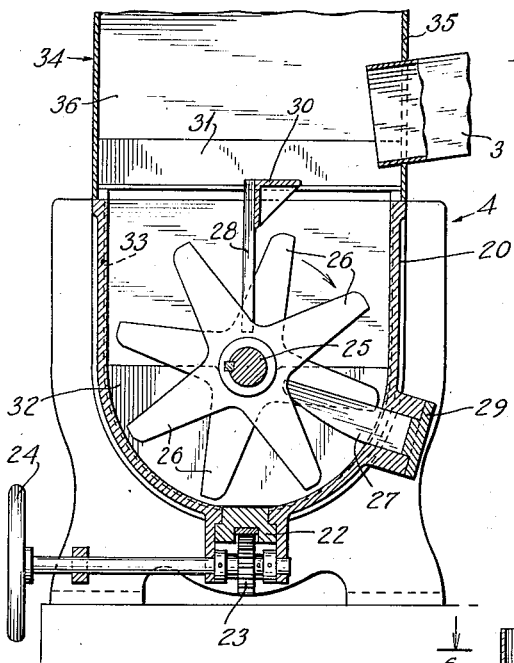
Fig. 4 is a cross-section thereof on the line IV—IV.

Referring first to Fig. 1, the raw sugar syrup which, in the case in hand, may be understood to contain or retain a certain percentage of the non-crystallizable component of the raw sugar, and in quantity sufficient to impart its characteristic flavor and color to the product, is discharged from the liquor tank to the cooker 1, wherein it is heat-concentrated in any appropriate manner to a thick consistency, in which condition it passes through a steam-vented conduit 2 into the feed-trough 3 of the granule-former 4, its temperature then being preferably between 275° F. and 290° F. and its water content in the order of, say, 4%.

Immediately on entering the granule-former, the thick syrup begins to crystallize, promptly becoming a stiff and stiffening paste which, by the progressing cutting and rubbing effect of the machine, presently described in detail, is gradually and rather quickly transformed into a mass resembling fine gravel, of which the maximum granule size is determined by the design of the machine and is subject to control, but in the case in hand runs approximately 3 mm. to 4 mm. in diameter. A certain portion of powder or fines is also produced at the dry end of this machine. From this machine, the still hot granular mass is delivered, continually, onto the constantly driven conveyor of a dryer 5, in which the granules are also cooled and from which they are delivered by way of pipe 6 to a centrifugal separator 7. This machine, well-known in various arts, includes a number of rotary surfaces by which the material is thrown outwardly by centrifugal effect, the heavier particles or granules falling while the fines and powder are drawn upward through a suction air pipe marked 8.

The product, thus freed of fines, is then passed by pipe 9 to a grader 10 composed of superposed reciprocating screens or the like, the function of which is to separate out the granules of the desired size, or within a predetermined range of size, which are to constitute the product and which are discharged by pipe 11 to the product bin. It is ordinarily preferred to constitute the product of granules which will pass a No. 6 Tyler screen and be retained on a No. 48 screen, i. e. between .295 mm. and 3. mm. This range is well suited for producing a free-flowing granular sugar product. Each granule is rough-surfaced and porous and the non-crystallizable matter in it is distributed throughout its mass.

The undersized granules and the fines incident to the screening pass into the pipe 12 while the oversize granules are delivered by pipe 13 to the cracking machine 14. In this machine, they are reduced to smaller size by a special cracking process which is different from ordinary crushing as will presently be described.

After cracking, the cracked granules or fragments pass by pipe 15, along with the undersized granules and fines from pipe 12, into the boot of a vertical elevator 16 by which they are carried upwardly and returned by pipe 17 into the pipe 6 leading to the centrifugal separator 7 wherein they join the freshly made product of the granule-former for separation of fines.

Thus all of the fines produced are removed by way of the air current through the centrifugal separator and out through pipe 8. The air current is maintained by the fan 18 and discharges into a cyclone dust separator 19, from which the air is discharged upwardly to atmosphere, or to a dust collector, and the fines downwardly into the feed-spout 3 of the granule-former 4 above referred to, where their presence assists in promoting crystallization by seeding and absorbing moisture. Except for the inconsequential amount of dust escaping with the air from the cyclone, all of the components, including the molassegenic material, of the original liquor are converted into product granules.

The granule-former 4, as shown, is structurally similar to machines already in use for the manufacture of a certain kind of powdered sugar, sometimes called "transformed sugar," but differs therefrom in certain important particulars. It comprises a round-bottomed trough 20 through which the sugar passes while being converted from paste to gravel form. The direction of movement is from right to left in the figure. The trough has a longitudinal outlet slot 21 in its bottom normally occupied by a sliding gate 22. This gate is provided with a rack and pinion 23 and hand-wheel 24, by which it can be moved back and forth in the slot, thus varying the effective position of the slot outlet from the trough. This adjustable outlet is not present in prior machines of this general type.

The trough houses a longitudinal rotary blade-shaft 25 appropriately journalled and carrying many working elements in the form of blades or fingers 26, which pass through the inter-spaces of a complementary series of fixed working elements or fingers as the shaft rotates. Some of these fixed fingers, marked 27, are mounted in the lower part of the trough and some of them, marked 28, are mounted on the upper part of the trough, but all reach close to the shaft as indicated so that the paste must pass between them. The lower fixed fingers 27 are conveniently formed on, or fixed in, a back plate 29 (Fig. 4) bolted into a socket in the trough side wall. The other fixed fingers 28 are carried on a beam 30, bolted at one end on the trough end wall or a part appurtenant thereto, and at the other end to an angle-bar cross-brace 31. The shaft-borne fingers are shown as four-armed discs. They are flat and parallel to each other, i. e. without pitch, and the sides of the fixed fingers are also flat and parallel to the rotary fingers. The clearance between the rotary fingers and the lower fixed fingers 27 is approximately five-sixteenths of an inch, and the clearance between the rotary fingers and the upper fixed fingers 28 is about five-thirty-seconds of an inch, which latter dimension, in a general way, serves to control the average size of the granule produced, which is to say that the minimum spacing (five-thirty-seconds) is not substantially greater than the maximum diameter desired for the granules of the product. This close spacing and relation of the clearances to the character of the product is also new in this class of machinery as is also the use of the upper set of fixed fingers, depending into the trough. The shaft is rotated in practice at about 325 R. P. M.

As a means of retarding the movement of the material through the trough, one or more cross-plates, acting as dams and marked 32, may be removably held in grooves 33 provided in the trough side walls. For removing the liberated steam, the whole trough is covered with a hood 34 connected at its top to an appropriate suction off-take, not shown. Access doors 35 are provided in the hood walls and baffles 36 are mounted in its interior. The syrup trough 3 passes through the hood wall to deliver the hot syrup into the rotating fingers and air also enters the hood at this point to aid in removing the steam which is liberated abundantly from the crystallizing sugar.

The thick syrup, carrying the fines from the cyclone separator as above pointed out, starts to crystallize almost instantly on its arrival in the trough, becoming a thick paste which is worked by the blade elements with a cutting and, more especially, a rubbing or rolling action, which automatically divides the mass into small pill-like bodies or granules as it is slowly worked along the trough toward the discharge outlet. Each granule is composed of many fine sucrose crystals compacted together by the action of the blades.

The pill-like condition is more or less critical and it is important that the rubbing action cease as soon as it occurs, which is to say, at that point along the trough where such condition has been attained in a maximum degree and where further working would serve only to increase the production of fines or powder by the attrition effect of the blades on the granules and of the granules on each other. The function of the adjustable outlet is to accommodate the machine to this condition which may obtain earlier or later, depending upon the amount of water in the syrup, the amount of molassegenic material therein, and the temperature. By proper adjustment, by far the larger part of the entering stock, estimated at about 70%, is converted by this machine into product-sized granules, in the range above given, thereby putting but a relatively small burden on the part of the system that handles the fines and oversized particles.

Figure 5:
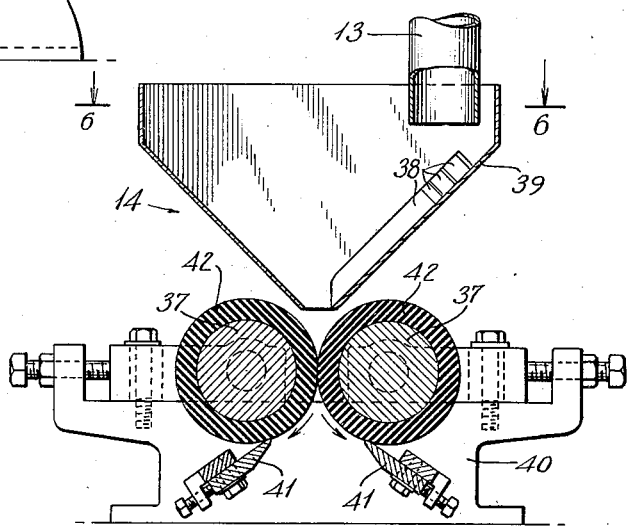
Fig. 5 is a cross-section of the cracking machine.
Figure 6:
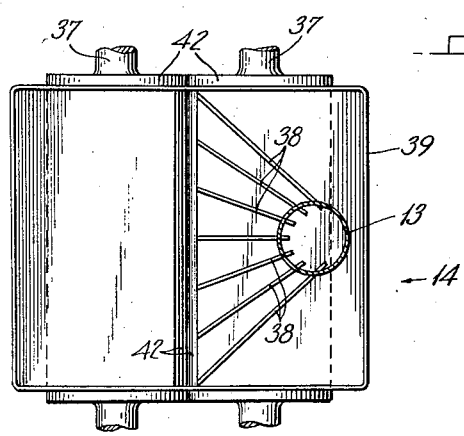
Fig. 6 is a partial plan thereof.

The cracking machine, marked 14 in Fig. 1, is illustrated in Figs. 5 and 6. It comprises a pair of coacting rolls 37 and a hopper 39 into which the oversized granules are delivered by pipe 13, and by which they are distributed along the bite of the two rolls, the distribution being accomplished by means of the diverging ribs 38 on the inclined wall of the hopper or otherwise. The two rolls are carried on a suitable support 40 with provisions for nice adjustment each to the other and have doctors 41 applied to their lower surfaces to keep them clean. They will be understood to be power-driven in any appropriate manner not shown. They differ from crushing rolls heretofore used for reducing the size of granular material, by the fact that they are resiliently surfaced, as by means of rubber indicated at 42. We have found ordinary hard-surfaced crushing rolls injure the surfaces of the granules formed by this process, by their action of crushing the small projecting corners of the crystals of which each granule is constituted and which project on its surface. This surface injury not only changes the surface-color of the granules, making them less attractive in appearance, but also promotes a tendency for them to stick together, in storage, whereas by providing the rolls with surfaces of a predetermined resilience and resistance to deformation pressure can be exerted upon the granules sufficient to overcome their cohesion so that they crack apart, without any marring of the surface and without producing any undue powder or dust. While it is possible that various yielding materials can be supplied to produce the effect referred to, adapted to crack without marring the granules, we have found that a grade of soft rubber which is highly resilient and gauges between 10 and 20 on the Plastometer (Pusey & Jones) using a ⅛ inch ball is most satisfactory. Depending on the amount and prevailing diameter of the oversized granules produced, there may be one or several cracking machines receiving the delivery or deliveries from the grader in parallel relation, each being preferably adjusted to the average granule size received by it. They are run in practice at about 200 R. P. M.

We claim:

1. The process of manufacturing a sugar product in granule form, which comprises cooking a raw sugar liquor containing crystallizable and non-crystallizable and flavoring components of the raw sugar liquor to a condition of thick syrup, subjecting the hot syrup while in process of cooling to a rubbing and rolling treatment between relatively moving surfaces spaced apart not substantially greater than the desired maximum granule size and until the hot paste becomes mainly constituted of crystal agglomerates of pill-like form constituting the granules, and ceasing such treatment when such condition has been reached and then cooling and drying the granules to form a free-flowing product.

2. The process of manufacturing a product in granule form, which comprises cooking a liquor containing crystallizable material to a condition of thick syrup, subjecting the hot syrup, while in process of cooling, to a rubbing and rolling treatment between relatively moving surfaces spaced apart not substantially greater than the desired maximum granule size and until the hot paste becomes mainly constituted of crystal agglomerates of pill-like form constituting the granules, then ceasing such treatment and cooling and drying the granules to form a free-flowing product, and thereafter separating out the particles below a predetermined minimum granule size.

3. The process of manufacturing a product in granule form which comprises cooking a liquor containing crystallizable matter to a condition of thick syrup, passing such syrup, while hot and in process of crystallizing, through a trough or chamber provided with a multitude of fixed working elements and a multitude of rotary working elements rotating through the fixed element interspaces, allowing the resulting hot paste to be worked along the trough by the action of said elements thereon and discharging it from the trough at a point therein where it has become mainly constituted of small pill-like, crystal agglomerates and where further treatment would produce only increasing amounts of fines or powder, and cooling and separating such pill-like agglomerates from the fines and any oversized particles to form a free-flowing product.

4. The process of manufacturing a product in granule form which comprises cooking a liquor containing crystallizable and non-crystallizable components to a condition of thick syrup, passing such syrup while hot and in process of crystallizing, through a chamber provided with a multitude of fixed working elements and a multitude of movable working elements moving through the interspaces of the fixed elements, allowing the thickening paste to be worked along the chamber by the action of said elements thereon, discharging the material from the chamber at a point thereof where it has become mainly constituted of compacted crystal agglomerates constituting granules, cooling such granules, separating the fines and oversized granules from the product-sized granules, drying and cracking the oversized granules to product size and adding such cracked granules to said separated product-sized granules.

5. The process of manufacturing a product in granule form which comprises cooking a liquor containing crystallizable matter to a condition of thick syrup, working such syrup while hot and in process of crystallizing into the condition of a thick paste, forming such paste into compacted crystal-agglomerate granules, cooling and grading such granules to a predetermined size-range, cracking the oversized granules, adding such cracked granules to said granules of predetermined size-range and returning the fines produced in said grading and cracking steps to said cooked syrup for reworking therewith.

6. The process of reducing the size of crystal-agglomerates which comprises exerting pressure on them between resilient-surfaced rolls sufficient to overcome their cohesive strength, the roll surfaces being soft enough not to crush the surface crystals.

7. The process of manufacturing a product in granule form which comprises cooking a liquor containing crystallizable matter to a condition of thick syrup, working such syrup while hot and in process of crystallizing to the condition of a thick paste and dividing it into small bodies or granules, passing such granules through a grader to separate therefrom the fines and oversized granules, reducing the latter granules to smaller size and passing both the fines and said reduced size and passing a second time through the grader.

8. The process of manufacturing a product in granule form which comprises cooking a liquor containing crystallizable and non-crystallizable components to a condition of thick syrup, passing such syrup, while hot and in process of crystallizing, through a chamber provided with a multitude of fixed fingers and a multitude of rotary fingers rotating through the fixed finger interspaces, allowing the thickening paste to be worked along the chamber by the action of said fingers thereon, discharging the material from the chamber at a point thereof where it has become mainly constituted of pill-like crystal agglomerates constituting granules, passing such granules through a grader to separate the fines and oversized granules, cracking the latter to reduced size and repassing said fines and cracked granules through said grader.

9. The process of manufacturing a product in granule form which comprises cooking a liquor containing crystallizable and non-crystallizable components to a condition of thick syrup, passing such syrup, while hot and in process of crystallizing, through a working chamber provided with fixed elements and movable elements moving through the fixed element interspaces, allowing the thickening paste to be worked along the chamber by the action of said fingers thereon, discharging the material from the chamber at a point thereof where it has become mainly constituted of pill-like crystal agglomerates constituting granules, cooling and drying such granules, passing them through a grader to separate the fines and oversized granules, crushing the latter to reduced size, repassing said fines and crushed granules through said grader, and returning the fines therefrom to the hot syrup in said working chamber.

10. The process of manufacturing a granular product which comprises forming compacted crystal agglomerates and reducing the size of such agglomerates by subjecting them to pressure in excess of their cohesive strength between resilient surfaces adapted not to appreciably crush the surface crystals thereof.

11. The process of manufacturing a granular product which comprises converting a sugar liquor containing crystallizable material into the form of crystal-agglomerates of pill-like form constituting granules, and reducing the size of such granules by subjecting them to pressure in excess of their cohesive strength between resilient rubber-like surfaces soft enough not to appreciably crush the surface crystals thereof.

12. The process of manufacturing a granular product of uniform color and predetermined range of granule size, which comprises working a hot syrup of crystallizable matter into a paste, dividing such paste into small bodies or granules, cooling and drying such granules, separating out any oversized granules and cracking the latter to smaller size by subjecting them to pressure in excess of their cohesive strength between rubber-like surfaces, and returning such cracked granules to the body of granules from which they were derived.

JOHN W. SCHLEGEL.
LOUIS LANG.